United States Patent [19]
Brun et al.

[11] 3,948,781
[45] Apr. 6, 1976

[54] SELECTIVELY PERMEABLE MEMBRANE ON HOLLOW CORD

[75] Inventors: Robert Brun, Bollene; Michel Pages, St. Martin d'Ardeche, both of France

[73] Assignee: Rhone-Poulenc-Textile, Paris, France

[22] Filed: May 10, 1974

[21] Appl. No.: 468,999

[30] Foreign Application Priority Data
May 14, 1973 France .............................. 73.17325

[52] U.S. Cl. ............................. 210/500 M; 427/426
[51] Int. Cl.² ........................................ B01D 31/00
[58] Field of Search ....... 210/321, 433, 500 M, 494, 210/490, 491; 117/47, 58, 95, 98; 264/41, 49; 427/426

[56] References Cited
UNITED STATES PATENTS

| | | | |
|---|---|---|---|
| 2,864,506 | 12/1958 | Hiskey | 210/500 M |
| 3,784,470 | 1/1974 | Richardson et al. | 210/494 X |
| 3,834,546 | 9/1974 | Brun et al. | 210/321 |

Primary Examiner—Frank A. Spear, Jr.
Attorney, Agent, or Firm—Cushman, Darby & Cushman

[57] ABSTRACT

A selectively-permeable tubular element is provided which comprises an essentially tubular sheath of uniform textile material, the whole of which has been heated to a uniform temperature such that the sheath can subsequently be bent in an arc of radius of curvature not exceeding about 10 cm while retaining substantially circular cross-section, with a selectively permeable membrane applied to the sheath.

16 Claims, 1 Drawing Figure

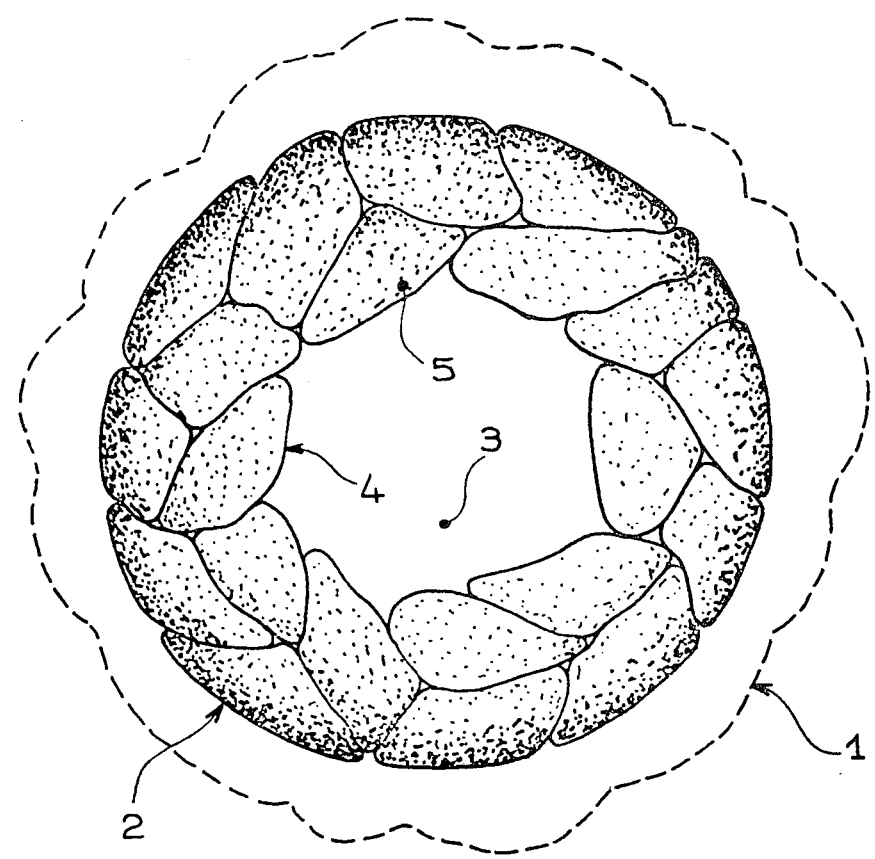

SELECTIVELY PERMEABLE MEMBRANE ON HOLLOW CORD

The present invention relates to tubular elements for separating fluids by selective permeability, which can be used, especially, for separating fluids by reverse osmosis, ultrafiltration or gas permeation.

In French Pat. No. 2,075,524, a membrane assembly for a reverse osmosis apparatus is described, which assembly comprises a grooved rod surrounded by a permeable sleeve covered with a reverse osmosis membrane, the grooves communicating directly with the outside via an opening. Such combinations, which have diameters of the order of a few millimeters, are very suitable for the manufacture of compact apparatuses. However, the relative rigidity of the grooved rod necessitates these combinations being arranged in parallel and rectilinear bundles.

It is, however, possible substantially to improve the conditions of flow of the fluids in contact with the membranes and thus the throughput of the apparatus if membrane support combinations are arranged in, for example, turns loops or coils, the radii of curvature of which can be as much as 30 or 40 centimeters, or, preferably, only a few centimeters, for example 10 centimeters or less. Moreover, it is possible to employ elements of greater unit length, for example of the order of 30 or 40 meters, and this reduces the relative size of the devices which have to be leakproof.

The present invention relates, firstly, to tubular elements for separating fluids by selective permeability, which permit the use of high pressures, give high permeate flow rates, can be manufactured continuously, automatically and economically and are very suitable for the manufacture of compact apparatuses. These elements can be bent quite considerably, without becoming blocked or causing membrane rupture.

According to the present invention there is provided a selectively-permeable tubular element for separating fluids by selective permeability, which comprises a selectively permeable membrane applied to a textile sheath possessing an axial channel communicating with the outside, the textile sheath being of uniform texture, the whole of which has been tightened and stabilised by heating right through, (so that it all reaches the same temperature) so that the sheath can then be bent in uniform turns with radii of curvature of from, especially, 1 to 10cm while retaining substantially circular cross-section.

The membrane is thus applied to a textile sheath which generally has the appearance of a hollow cord. Without special treatment, a hollow cord has a relatively loose texture, and offers poor resistance to radial or axial external pressures; moreover, its croos-section is often ovoid, and when attempts are made to curve the cord, it has a tendency to bend unevenly, to become blocked locally and/or to cause membrane ruptures.

The tubular element used in the present invention can be produced by subjecting the textile sheath beforehand to an extensive heat treatment. To do this, the textile sheath is passed through a heating zone raised to a high temperature, close to the maximum temperature which the textile material can withstand without undergoing appreciable harmful deterioration. The textile sheath remains in this heating zone for a sufficient period of time for thermal equilibrium to be reached throughout the sheath so that it is heated right through. The heating zone may contain a fluid such as air, a vapour, for example steam, or a liquid, for example caliqua oil (hydrogenated squalene) or glycol. A continuous passage oven may be used as the heating zone. The textile sheath thus treated is then covered with a selectively permeable membrane. For example, it is possible to introduce a membrane, prepared beforehand, along and around the heat-treated textile-sheath.

It has been found that a heat-treatment carried out under these conditions achieves the following main results:

a. Firstly, it causes uniform contraction of the yarns or fibres forming the textile sheath against one another. Thus, in a woven sheath, the warp yarns and the weft yarns are contracted uniformly around the central fibres of the sheath. This contraction thus generally results in a decrease in the external diameter of the sheath and possibly in an increase in its internal diameter. The original loose texture thus becomes a tight and uniform texture.

The resistance of such a texture to mechanical stresses is hence substantially improved. Thus a non-treated braided sheath undergoes immediate deformation under the effect of a radial or axial compression, whilst the same stress need not cause any substantial deformation on a sheath treated according to the process of this invention.

b. A self-calibrating effect takes place. It is found that unevennesses in the cross-section of the textile sheath are considerably reduced and quite frequently dissappear completely. The change in the texture of the textile sheath and the self-calibration result in a considerable improvement in resistance to crushing, and, more generally, to external radial pressures.

c. This treatment also produces stabilisation of the fibres or yarns forming the textile sheath; they thus lose the "memory" of the stresses to which they have been subjected. Thus, if a non-treated textile sheath is sectioned, it can generally be seen that the yarns fray at their end and come apart because the tensions to which they were subjected are then released. In contrast, a textile sheath which has been heat-treated according to this invention retains a cut end intact i.e. the yarns remain unchanged in their original relative position.

d. The treatment makes it possible substantially to improve the permeability to fluids of the textile sheath under the effect of a radial pressure.

e. This treatment also enables the textile sheath to be bent in uniform turns with radii of curvature of from, especially, 1 to 10 cm and, at the same time, to retain substantially circular cross-section at every point. In contrast, it is generally found that a textile sheath which has not been treated or which has been heat-treated at the surface only, bends unevenly and becomes blocked locally by forming sharp angled bends, which generally tear the membrane on its surface.

After the heat treatment, the textile sheath is preferably calibrated. This operation can be effected, for example, by drawing the textile sheath through a convergent tube which is generally heated and is preferably situated immediately after the outlet from the oven. The objects of this operation are essentially to perfect the circular external profile of the textile sheath, to calibrate the external diameter and to flatten all the asperities i.e. surface unevennesses and roughnesses which may possibly be present on the surface of the textile sheath. These asperities arise principally from the ends of fibres or yarns which stick out above the external surface of the textile sheath; they present a risk in that a membrane produced by direct coating of the textile sheath with a suitable collodion may be pierced by them.

As the textile sheath, it is possible to employ, for example, a woven sheath, a knitted sheath, a sheath made of non-woven material or a sheath consisting of a yarn wound up helically, the yarn having a circular or flattened cross-section permitting over-lapping or interlocking; a braided sheath is preferably used. It is also possible to use a sheath consisting of several successive layers. These sheaths can be manufactured on a mandrel. They can be made from yarns and/or fibres of natural or artificial material. They are advantageously made of synthetic materials.

Preferred synthetic materials are those which soften gradually on heating, the softening zone extending over a temperature range of at least 5°C and preferably at least 15°C. The temperature of the heating zone through which these synthetic materials pass should then be equal to or generally above this softening temperature range. Synthetic materials which are very suitable for use in the present invention include polyolefines, polyesters, polyacrylic resins, polyamides, polyvinyl resins and fluorinated resins as well as mixtures of them.

The yarns can be single-strand, or, preferably, multi-strand, yarns. The number of strands in e multistrand yarns is generally from 5 to 200, and preferably from 50 to 150. The gauge of the yarns can be from 10 to 3,000 denier, preferably from 250 to 1,500 denier.

The external diameter of the heat-treated textile sheath is generally from 1 to 10 mm, and preferably from 1.5 to 3mm. The ratio of the external diameter to the internal diameter of the heat-treated textile sheath is generally from 1.5: 1 to 5:1.

A textile sheath which has been heat-treated according to the invention can be covered, by any known means, with a selectively permeable membrane, for example by locating a membrane prepared beforehand around the textile sheath. Preferably, and generally after calibrating the textile sheath, as described above, a membrane is formed by direct coating of the textile sheath with a film-forming collodion from which the solvent is evaporated. Such a technique is described in, for example, French Pat. Nos. 1,426,548 and 1,506,402 and U.S. Pat. No. 3,446,359.

Any semipermeable membrane which, when stored dry or moist, possesses a sufficient degree of elongation at break to enable it to follow closely, without rupturing, the minimum radii of curvature imposed on the textile sheath support can be used in this invention. For example, for reverse osmosis, it is possible to use membranes based on cellulose acetate, such as those described in French Pat. No. 1,426,548, or ion exchange membranes made of sulphonated polyarylethersulphones, such as those described in U.S. Pat. No. 3,709,841; for ultrafiltration, it is possible to use membranes made of polyacrylonitrile, such as those described in Belgian Pat. No. 772,361, or di-ionic membranes based on complex polyelectrolytes, such as those described in French Pat. No. 2,144,922, and, for gas permeation, it is possible to use microporous membranes based on silicone elastomers or polyvinyl chloride, or membranes based on polyvinyl trimethylsilane, such as those described in Belgian Pat. No. 728,247.

In order to prepare a tubular element of the present invention, the following procedure is generally employed.

The textile sheath, unwound from a drum, passes through a continuous passage oven heated to a constant, previously determined, temperature, and is then drawn through a convergent calibration tube (or die) which is preferably heated; finally, after cooling, the sheath is covered with a membrane in known manner.

Longitudinal shrinkage of the sheath inside the oven is generally observed, followed by elongation at the outlet from the die of the calibrator where the sheath is subjected to a traction force. The shrinkage of the sheath can be adjusted, relative to its elongation, by varying the rate at which it is unwound from the drum. If desired, it is thus possible to prepare pre-stressed tubular elements, in particular for separating fluids by selective permeability. These elements, elongated beforehand so that they are stretched before assembly, possess improved resistance to compression forces, and especially to axial compression forces to which they may possibly be subjected. Pre-stressing is especially valuable in the case of tubular elements designed to be placed inside a pressurised chamber, which is closed at one end and open at the opposite end over a permeate manifold.

The tubular elements of this invention can withstand high external pressures, for example of the order of 50 bars, without undergoing significant deformation They enable the permeate to flow freely, with minimum pressure drops, through the axial channel, which can thus be of great length. These tubular elements are also suitable for a continuous, and hence more economic, manufacturing process, which can easily be made automatic. They make it possible to manufacture compact apparatuses, that is to say apparatuses which possess a large surface area of exchange for a given volume. Their very flexible structure, which is resistant to crushing, considerably facilitates their use. Moreover, they can be arranged in such a way as to promote the hydrodynamic flow of the fluids at the surface of the membranes, and thus substantially to increase the efficiency of the apparatus.

These tubular elements are particularly useful for the separation, purification or concentration of liquid or gaseous fluids, in accordance with the techniques of reverse osmosis, ultrafiltration, gas permeation or pervaporation.

The following Examples further illustrate the present invention;

EXAMPLE 1

A flexible hollow cord is used which consists of a braided textile sheath which is made of polyethylene yarns. The sheath comprises 20 laces i.e. braided yarns of 1,000 denier, doubled, with 20 turns to the meter. The yarns are multi-strand yarns, consisting of 90 strands with a tri-lobal cross-section. The internal and external diameters of the cord are, respectively, 1.2 and 3 mm.

The cord is passed through an oven kept at a constant temperature of 250°C. The dwell time of the cord in the oven is adjusted to 8 seconds. At the outlet from the oven, the cord is drawn through a convergent tube of internal diameter 2.3. mm. After treatment, the internal and external diameters are, respectively, 1.1 and 2.4 mm.

A collodion based on cellulose acetate is then deposited on the cord, working in accordance with the techniques described in French Pat. Nos. 1,426,548 and 1,506,402. The whole is kept at a temperature of 0°C for 30 minutes and is then heated to a temperature of 70°C for 10 minutes. The membrane thus formed on the cord has a substantially uniform thickness; it is adherent to the support and does not tear, even when it is bent in arcs of radii 10 to 15 mm.

The semi-permeable element thus produced is cut into 684 identical sections of unit length 1.35 meters, which are arranged in the form of a U and are sealed near the open ends, by means of epoxy resin, into sockets mounted in a leakproof manner on a plate dividing a closed chamber into two compartments. The first compartment is equipped with two axial tubes which make it possible to set up a flow of unpurified water under pressure inside (the compartment). Pure water which has passed through the mebranes by reverse osmosis is collected in the second compartment, at the open ends of the semi-permeable elements.

The following results are obtaned; Q denotes the rate of flow of pure water expressed in liters per day per $m^2$ of membrane and the degree of rejection denotes, as a percentage, the ratio between the amount of salt held back by the membrane and the original amount of salt.

With a water of degree of hardness = 30°F (French) at 20°C, under 30 bars,

Q = 720 $1/m^2$/day, with a degree of rejection of 92%.

EXAMPLE 2

A semi-permeable element identical to that described in Example 1, of length 45 cm, is wound up helically with an average diameter of 25 mm inside a closed chamber.

With a water of degree of hardness = 30°F at 20°C under 30 bars, the following result is obtained:

Q = 943 $1/m^2$ /day, with a degree of rejection of 94.1%.

A semi-permeable element which is identical to and the same length as the above, is now placed along the axis of the closed chamber.

Under the same conditions (water of degree of hardness = 30°F at 20°C under 30 bars), the following result is obtained.

Q = 759 $1/m^2$/day, with a degree of rejection of 97.3%.

It can thus be seen that bending the semi-permeable element so that is has a small radius does not substantially alter its performance, while enabling one to benefit from all the advantages inherent in an element which can be bent to a small radius of curvature.

By way of comparison, a cord which has been heated at the surface, only smoothed and calibrated, but not treated right through as in accordance with the process of this invention, can only withstand being bent so as to have a minimum radius of curvature of 100 mm. Furthermore with a water of degree of hardness of 32.8 at 20°C, under 25 bars, the following result is obtained:

Q = 720 $1/m^2$/day, with a degree of rejection of 94%.

EXAMPLE 3

A hollow and flexible cord is prepared, which consists of a braided textile sheath made of 40/2 cotton yarns ( two ends twisted, warp twist ), composed of 20 laces of two yarns. The external diameter is 2.5 mm.

The cord is passed at a rate of 12 cm/second through an oven kept at a constant temperature of 250°C, and it is then drawn through a convergent tube of diameter 2 mm. After the treatment, the diameter of the cord becomes fixed at 2.2 mm.

A collodion based on cellulose acetate is then deposited on the cord, following the procedure of Example 1. This cord withstands an external pressure of 70 bars.

With this element, the following results are obtained: with a water of degree of hardness = 30°F at 20°C under 30 bars, the permeate flow rate is:

Q = 784 $1/m^2$/day, with a degree of rejection of 90%.

This Example shows that the present invention is applicable to sheaths made of natural material.

EXAMPLE 4

A flexible and hollow cord is prepared, which consists of a braided textile sheath made of cellulose triacetate yarns composed of 20 laces of four yarns, each of 300 denier consisting of 72 strands. The external diameter is 2.95 mm.

The cord is passed at a rate of 7 cm/second through an oven at 250°C, and is then drawn through a convergent tube of diameter 2.5 mm heated to 120°C.

A collodion based on cellulose acetate is then deposited on the cord, following the procedure of Example 1. This cord withstands an external pressure of 40 bars.

With this element, the following results are obtained: with a water of degree of hardness = 30°F at 20°C under 30 bars, the permeate flow rate is Q = 847 $1/m^2$/day, with a degree of rejection of 98.2%.

EXAMPLE 5

A flexible and hollow cord is prepared, which consists of a textile sheath knitted on a head with 6 needles using a tri-lobal polyethylene yarn of 1,000 denier, doubled with 20 turns to the meter. The external diameter is 4 mm. The resistance to the external pressure is practically zero before heat treatment.

The cord is passed at a rate of 9.8 cm/second through an oven kept at a constant temperature of 250°C, and is then drawn through a convergent tube of diameter 2.6 mm heated to a temperature of 120°C.

A collodion based on cellulose acetate is then deposited on the cord, following the procedure of Example 1. With a water of degree of hardness = 30°F at 20°C under 30 bars, the result obtained in Q = 559 $1/m^2$/day, with a degree of rejection of 96.7%.

This Example, and the following Example, show that the invention is not restricted to braided textile sheaths.

EXAMPLE 6

A hollow and flexible cord of external diameter 3 meter is prepared, which consists of a textile sheath made of polypropylene woven with a satin-type weave with 5 strands caught up and 2 dropped. The warp consists of 86 multistrand yarns of 200 denier, doubled with 340 turns to the cm. The weft consists of multistrand yarns of 200 denier, doubled with 340 turns to the meter. It is produced by 20 pirn passes to the cm, per face on both faces.

The cord is passed at a rate of 12 cm/second through an oven kept at 250°C, and is then drawn through a convergent tube heated to a temperature of 120°C.

A collodion based on cellulose acetate is then deposited on the cord, following the procedure of Example 1. This cord withstands an external pressure of 70 bars.

With this element, the following results are obtained: with a water of degree of hardness = 30°F at 20°C under 30 bars, the permeate flow rate is
Q = 843 1/m²/day, with a degree of rejection of 89.4%.

EXAMPLE 7

A flexible and hollow cord of external diameter 2.5 mm is prepared, which consists of a textile sheath made of 130/2 shrunk polyester yarn, warp twist, braided with 20 laces of 4 yarns. The cord is passed at a rate of 12 cm/second through an oven at 250°C and is then drawn through a convergent tube of diameter 2.2 mm heated to 120°C. A collodion based on cellulose acetate is then deposited on the cord, as in Example 1. This cord withstands an external ressure of 70 bars.

With a water of degree of hardness = 30°F at 20°C under 30 bars, the permeate flow rate is
Q = 1,000 1/m²/day, with a degree of rejection of 97.9.%

EXAMPLE 8

A hollow and flexible cord of external diameter 2.2 mm is prepared, which consists of a textile sheath braided with 20 laces of a tri-lobal polyethylene yarn of 700 denier with 20 turns per meter.

The cord is passed at a rate of 12 cm/second through an oven at 250°C, and is then drawn through a convergent tube of diameter 2.05 mm heated to 120°C. A collodion base on cellulose acetate is then deposited on the cord, as in Example 1.

With a water of degree of hardness = 30°F at 20°C under 30 bars, the permeate flow rate is
Q = 800 1/m²/day, with a degree of rejection of 96.8%.

These results are obtained with a rectilinear cord. They are exactly the same if the cord is wound up on a bobbin with a diameter of 20 mm and is then straightened out again in order to test it once more under the same conditions; this shows that the element can be wound up quite tightly without harming it.

The resistance to crushing of these cords is also measured, firstly before, and then after, the stoving and smoothing operations. To do this, a row of 10 identical cords are placed in parallel under a vertical steel strip, the horizontal edge of which has a radius of 1 mm, and the forces (in kg) which must be exerted on the cords in order to produce a deformation of a particular height are measured. The following results are obtained:

| Deformation in 100ths mm | 20/100 | 40/100 | 60/100 | 80/100 |
|---|---|---|---|---|
| Deformation force (in kg) on untreated cord | 0.35 | 0.60 | 1.10 | 1.90 |
| Deformation force (in kg) on treated cord | 3.20 | 5.60 | 7.50 | 10.00 |

It can be seen that, by carrying out the stoving treatment, the cords acquire a structure which considerably improves their resistance to crushing. It is also found that this structure remains sufficiently porous to allow satisfactory permeate flow rates.

The present invention is illustrated, merely by way of example, with reference to the accompanying drawing in which the FIGURE represents, schematically, a very greatly enlarged cross-sectional view of a typical assembly according to this invention.

The original external profile of the textile sheath forming the cord is represented by the broken line 1. The external profile of the textile sheath after treatment is denoted by 2. The internal profile of the textile sheath defining an axial channel 3, is denoted by 4. In the embodiment illustrated, the textile sheath consists of braided multi-strand yarns 5. It can be seen that, after treatment, the yarns are imbricated with one another, that is to say bent to occupy the last dead space.

We claim:
1. A selectively-permeable tubular element which comprises an essentially tubular sheath of uniform textile material having an external diameter up to about 10mm, the whole of which has been heated to a uniform temperature such that the sheath can subsequently be bent in an arc of radius of curvature not exceeding about 10cm while retaining substantially circular cross-section, with a selectively permeable membrane applied to the sheath.

2. An element according to claim 1, in which the external surface of the textile sheath has a substantially constant diameter.

3. An element according to claim 1 in which the textile sheath consists of yarns and/or fibres made of synthetic material.

4. An element according to claim 3, in which the synthetic material softens over a temperature range of at least about 5°C.

5. An element according to claim 4, in which the synthetic material is a polyolefine.

6. An element according to claim 1 in which the textile sheath is a braided sheath.

7. An element according to claim 1 in which the textile sheath is made from multi-strand yarns.

8. An element according to claim 1 in which the circular cross-section of the sheath has an external diameter of from 1 to 10 mm.

9. An element according to claim 1 in which the textile sheath is covered externally with a membrane based on cellulose acetate.

10. An element according to claim 1 in which the sheath has been pre-stressed.

11. Process for the preparation of a selectively-permeable tubular element as defined in claim 1 which comprises passing an essentially tubular sheath of a uniform textile material through a heating zone of the textile at a temperature which is close to the maximum temperature which the material can withstand without undergoing significant deterioration for a sufficient period of time to achieve thermal equilibrium throughout the sheath, and covering it with a selectively permeable membrane.

12. Process according to claim 11, in which after being passed through the heating zone and before being covered with the membrane, the textile sheath is drawn through at least one convergent tube so as to remove the asperities from its external surface and so as to give it a substantially constant external diameter.

13. Process according to claim 11 in which the sheath is made of yarns and/or fibres of synthetic material and the heating zone is at a temperature within the range over which the material softens.

14. Process according to claim 12 in which the sheath is made of yarns and/or fibres of synthetic material and the heating zone is at a temperature within the range over which the material softens.

15. Process according to claim 11 in which the membrane is formed in situ around the textile sheath.

16. Process according to claim 11 in which the membrane is prepared beforehand and is applied around the textile sheath.

* * * * *